GAS DIODE TRANSLATOR

Filed Jan. 6, 1953

6 Sheets-Sheet 1

INVENTOR
P. MALLERY
BY
J W Schmied
ATTORNEY

INVENTOR
P. MALLERY
BY J. W. Schmied
ATTORNEY

April 24, 1956 P. MALLERY 2,743,316

GAS DIODE TRANSLATOR

Filed Jan. 6, 1953 6 Sheets-Sheet 3

INVENTOR
P. MALLERY
BY J. W. Schmied
ATTORNEY

April 24, 1956 P. MALLERY 2,743,316

GAS DIODE TRANSLATOR

Filed Jan. 6, 1953 6 Sheets-Sheet 4

INVENTOR
P. MALLERY
BY
J W Schmied
ATTORNEY

INVENTOR
P. MALLERY
BY
J W Schmied
ATTORNEY

April 24, 1956 P. MALLERY 2,743,316

GAS DIODE TRANSLATOR

Filed Jan. 6, 1953 6 Sheets-Sheet 6

INVENTOR
P. MALLERY
BY J. W. Schmied
ATTORNEY 2,743,316

GAS DIODE TRANSLATOR

Paul Mallery, Murray Hill, N. J., assignor to Bell Telephone Laboratories, Incorporated, New York, N. Y., a corporation of New York Application January 6, 1953, Serial No. 329,883

19 Claims. (Cl. 179—18)

This invention relates to translators and more particularly to gas diode translators having a readily changeable arbitrary code.

Translators are herein defined as switching system elements which, in response to an inquiry in the form of an input code, supply an answer in the form of an output code to the elements presenting the input code or to some other elements. For example, in a common control telephone system in a multioffice city, when a subscriber dials the digits of a local number, called the office code, the number is received by the switching equipment of the originating office as a decimal number with three digits or less. The switching equipment in extending the call to the central office indicated, may have to set up connections at numerous stages of switches, some in distant offices which are not indicated by the dialed code. The switching operations which must be performed by the control equipment to reach the desired office are, in fact, represented by a numerical code but this number is usually quite different from the dialed number and has no natural relation thereto. A translator is used to convert the dialed number to the required new code comprising the instructions for the switching operations which must be performed. It is common practice therefore in the translator art to decode or translate a directory number dialed by the calling subscriber into a new series of numbers or designations corresponding to the equipment selection of the line, the type of ringing signal and such other information as may be desired or required by the switching apparatus. With the aid of such a translator or decoder a marker or other comparable common control circuit is enabled to establish a desired connection through the switching equipment to the called line in response to the dialed directory number. In systems, as for example, of the cross bar type such as described in the Patent 2,585,904 which issued on February 19, 1952 to A. J. Busch, the idea of not using the numerical digits of the called subscriber as the switching control code is carried further. There are no terminals numbered as subscriber telephone numbers and the various switches obtain access to the called subscribers by connecting to terminals which are referred to as line equipment numbers. The line equipment numbers correspond to subscribers' lines and are associated with subscribers' numbers on an entirely arbitrary basis. The equipment numbers are not four-digit numbers but each is a series of five one or two-digit numbers which indicate the locations of the equipment on the frames. Here again use is made of translation to convert the dialed decimal number to the non-decimal number forming the switching instructions that the common equipment must have in order to reach a called subscriber. The associations of the input and output codes are entirely arbitrary and may be changed from time to time to make changes in number assignments so that the type of translator employed is referred to as the changeable type with arbitrary correspondence. This type of translator especially when used in large offices having 10,000 or more numbers, or input codes, is a large scale affair and is very costly.

The prior telephone switching art translators were either route relay translators or electromechanical translators. Relay translators have a plurality of contacts on each route relay which are connected to points on the translation field by means of a plurality of soldered cross-connections. Changing the cross-connections in order to change the code involves difficult changing of electrical connections, unsoldering operations, removing, rerunning and resoldering operations. Moreover, due to the large numbers of cross-connections which are necessary, the relay translators occupy a relatively large volume which is often excessive for the available space. The electromechanical devices have a plurality of moving members or components which require constant maintenance.

It is then an object of the present invention to provide for a novel gas tube translator in which translation changes are readily made.

Another object of the present invention is the provision of a translator which is capable of rapidly providing a large number of selections for translating input signals received in one code to output signals in a different code, such as may be employed in telephone central office switching and similar applications.

Still another object of the present invention is the provision of a novel translator in which is eliminated the necessity of changing soldered cross-connections when changing the code.

Still another object of the present invention is the provision of a novel diode translator in which translation changes can be made economically and rapidly so as to reduce the length of time that common control circuits are out of service.

Still another object of the present invention is the provision of apparatus which performs the decoding and translating functions in common control telephone switching systems and which comprises gas tubes so as to reduce the time required for the establishment of conversations and thus increase the call carrying capacity of a telephone switching office.

The present invention overcomes the difficulties presented by the prior art and accomplishes the above objects by providing for a gas diode translator. The gas diode translator utilizes a sequential switch which connects voltage through one or two of a plurality of selector switches during a given interval to a plurality of chains and gas diodes. The voltage is such as to provide for a preferential firing of only some of the chains of tubes, each of which contains at least one channel tube. The code provides for a given output by sequentially firing a channel tube in a chain of tubes during one internal of the sequence of operation and then maintaining it fired while allowing the rest of the tubes in the chain to extinguish. Before the extinguishment of the rest of the tubes in the chain another chain of tubes containing the same channel tube and another channel tube is fired. As the sequence progresses a series chain of conducting channel tubes is pieced together forming the path from ground to an output device or relay. If the code is such as to fail to provide for the continued conduction of any channel tube no further chains of gas tubes in the path towards the respective output device will ionize. The code is highly flexible and may be changed simply by removing or inserting the gas tube.

It is then still another object of the present invention to provide for a novel gas tube translator which accomplishes the translation function by sequentially firing chains of gas tubes, where each tube is controlled by an element of the code.

Still another object of the present invention is the provision of a selectively conductive chain of gas tubes where each link in the chain is controlled by an element of the translator code.

Still another object of the present invention is the provision of a gas diode translator where the translation function is accomplished by having a chain of fired or conductive tubes recycled or progressively and retrogressively built up until the entire chain is conductive.

Further objects and advantages will become apparent to those skilled in the art upon consideration of the following description when taken in conjunction with the drawings wherein.

Figure 8:
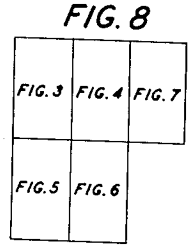

Figs. 3, 4, 5, 6 and 7, when arranged according to Fig. 8, are a circuit representation of a gas diode translator embodying the features of the present invention; and Fig. 8 illustrates the arrangement of Figs. 3, 4, 5, 6 and 7.

Figure 1:
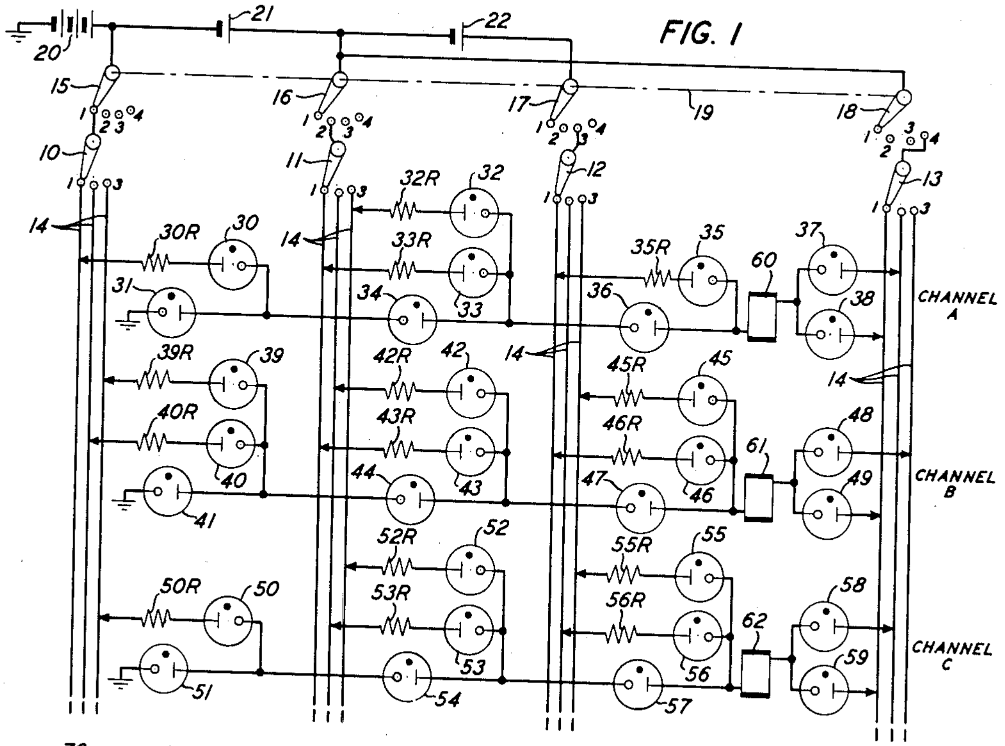
Fig. 1 is a circuit representation of a gas diode translator illustrating the build-up of a conductive channel.

Referring to Fig. 1 which illustrates a gas diode translator, the input code or digits are selected independently by the selector switches or registers 10, 11, 12 and 13. In the illustrative example and as shown in Fig. 1, the switches 10 through 13 are set for an input number 1111 and are connected at each of three terminals to a bus bar 14. Any number of terminals and bus bars 14 may be utilized depending upon the type of input code. For example, in utilizing a binary input code only two terminals are necessary whereas the utilization of the decimal code would require ten terminals. It is evident, therefore, that the three terminals shown are only illustrative. The movable contact or output lead of the selector switches 10 through 13 makes contact with one of the terminals and the input lead thereto is connected to a section 15, 16, 17 or 18 of a sequential switch 19. The sequential switch 19 is arranged with a series of four terminals associated with each of the sections 15 through 18. Terminal 1 of section 15 is connected to selector switch 10, terminal 2 of section 16 is connected to selector switch 11, terminal 3 of section 17 is connected to selector switch 12 and terminal 4 of section 18 is connected to selector switch 13. A translation is obtained after the selector switches 10 through 13 are set when the sequential switch 19 moves across the terminals 1 through 4 in a counter-clockwise manner. The sequential switch 19 operates over an eight-interval sequence of operations during each cycle. During the first interval the arms of sections 15 through 18 of the switch 19 are connected to terminals 1, during the second interval to terminals 1 and 2, and during the third interval to terminals 2 alone. At every instant in the sequence of operations, at least one of the terminals 1 through 4 is utilized. During the last or eighth interval the arms of the switch 19 return to their start position. The arms of sections 15, 16 and 17 are connected respectively to the positive terminals of potential sources or batteries 20, 21 and 22. The negative terminal of battery 22 is connected to the positive terminal of battery 21 and also to the section 18 and of sequence switch 19. The negative terminal of battery 21 is connected to the positive terminal of battery 20, the negative terminal of which is grounded. The battery 20 supplies a potential which is four times the sustaining potential of the tubes 30—59 which are hereinafter described, and each of the batteries 21 and 22 supplies a potential which is equal to the sustaining potential.

The batteries 20, 21 and 22 are connected through the sequence switch 19, selector switches 10 through 13 and bus bars 14, as is hereinafter described, to ionize or break down selected chains of gas tubes 30 through 59. The gas tubes 30 through 59 are diodes having breakdown potentials appreciably higher than their sustaining potentials. Any negative resistance device having such a characteristic may be utilized in place of the diodes 30 through 59. For example, a transistor of the type described in the Patent 2,524,035 which issued to Bardeen-Brattain on October 3, 1950, having a relatively large base resistance would be suitable. The transistor can be connected into the circuit as a two-terminal device by connecting together the emitter and base resistance leads as one terminal and the collector as the other and so be readily a substitute for a diode in the present circuit. Gas triodes have breakdown potentials across their main gaps appreciably higher than the required sustaining potentials. The ratio of breakdown to sustaining potential in these devices may be from 1.5 to 1 to 8 to 1 or more. In the illustrative example of the present invention, this ratio is assumed to be 2, but any other ratio in this range may be adapted for use in a translator employing the principles disclosed herein. The potential therefore necessary to break down one of the diodes 30 through 59 will be designated by the numeral "2" and the voltage necessary to maintain or sustain conduction will be designated by the numeral "1." The voltage supplied by battery 20 is equal to twice the breakdown potential of one of the diodes 30 through 59, or "four" volts, and the voltage supplied by each of the batteries 21 and 22 is equal to the sustaining potential of one of the diodes 30 through 59, or "one" volt.

The gas diodes 30 through 59 are divided into two groups dependent upon their function. The diodes that determine the code are hereinafter referred to as code tubes and the diodes that provide the final selected path to an output channel relay 60, 61, 62, etc. are hereinafter referred to as channel tubes. The diodes 30, 32, 33, 35, 37, 38, 39, 40, 42, 43, 45, 46, 48, 49, 50, 52, 53, 55, 56, 58 and 59 are code tubes and the diodes 31, 34, 36, 41, 44, 47, 51, 54 and 57 are channel tubes. The code tubes are inserted or removed from the translator circuit whenever the code is changed and have associated with their anodes a resistor designated by the same number as the code tube with a suffix R. With the code tubes as shown, the operation of the sequence switch 19, as is hereinafter described, provides for the energization of the channel relay 60. In the translator shown in Fig. 1, it is assumed that the final result of the translation is the operation of one or more channel relays 60, 61, 62, etc.

When the sequence switch 19 is operated, it makes contact with the terminals 1 connecting the four volts from battery 20 to the selector switch 10 and through terminals 1 thereof, bus bar 14 and resistor 30R to the code tube 30. Four volts are thus applied across the serially connected code tube 30 and channel tube 31. Each of these tubes require two volts to break down so the four volts are sufficient therefor. The tubes 30 and 31 ionize with the potential across each reducing to the one volt sustaining potential. The voltage across resistor 30R increases to two volts which is the difference between the applied voltage from battery 20 and the sum of the sustaining voltages across the chain of ionized tubes 30 and 31.

During the second interval in the sequence of operation the selector switch 19 makes contact with terminals 1 and 2. The four volts from battery 20 still maintain the ionization in tubes 30 and 31 through terminal 1 of section 15. The sum voltage of batteries 20 and 21, or five volts, is connected through selector switch 11 to the anode of code tubes 33 and 43. The code tubes 33 and 43 are connected to the bus bar 14 which is connected to terminal 1 of the second digit selector switch 11 set at terminal 1. Five volts are therefore connected across two chains of tubes; one consisting of tubes 33, 34 and 31 and the other consisting of tubes 43, 44 and 41. The code tube 33 and the channel tube 34 ionize or break down as the five volts supply one volt to the already ionized channel tube 31 and two volts to each of the tubes 33 and 34. The channel tube 41, however, was not ionized during the first interval so that six volts are necessary for the chain of tubes 43, 44 and 41. Only five volts are applied as described above and these tubes do not ionize. The five volts applied to the chain of tubes 33, 34 and 31 are also applied to still another chain consisting of tubes 33, 32, 52, 54 and 51. At least ten volts would be required to ionize this chain so none of the tubes therein ionizes. The five volts applied through the sequence switch 19 and selector switch 11 therefore select one of a plurality of chains of gas tubes. The only tubes shown in Fig. 1 that are ionized at the end of the second interval are the tubes 30, 31, 33 and 34.

During the third interval in the sequence of operation the sequence switch 19 breaks contact at its terminals 1 but maintains connection through its terminals 2. When the four volts are removed from selector switch 10 the code tube 30 ceases to conduct. Channel tube 31 remains ionized being part of the ionized chain of tubes 33, 34 and 31 which are connected to battery 31 through terminals 2 of the sequence switch 19 and terminals 1 of the selector switch 11. The only tubes ionized at this time are the code tube 33 and the channel tubes 34 and 31.

During the fourth interval in the sequence of operation the sequence switch makes contact through its terminals 2 and 3. The chain consisting of tubes 33, 34 and 31 remains ionized and six volts from the three batteries 20 and 21 and 22 are connected to the selector switch 12. The six volts are applied to the following chains of tubes: 35, 36, 34 and 31; 35, 36, 33, 43, 44 and 41; 46, 47, 44 and 41; 46, 45, 55, 57, 54, 51. The six volts are insufficient to ionize any of the chains except the chain of tubes 35, 36, 34 and 31. Channel tubes 34 and 31 have already been ionized during the preceding intervals in the sequence of operation and so require only a total of two volts. The code tube 35 and the additional channel tube 36 each requires two volts making a total of six volts which is the supplied voltage. Any of the other chains to which the six volts are applied require more than six volts to initiate ionization and therefore the tubes therein remain non-conducting. The only tubes shown in Fig. 1 that are ionized at the end of the fourth interval are the code tubes 33 and 35 and the channel tubes 31, 34 and 36.

During the fifth interval in the sequence of operation the sequence switch removes the five-volt potential from the terminals 2 but maintains the six volts to the terminals 3. The code tube 33 extinguishes but the channel tubes 31 and 34 remain conducting being part of the conductive chain consisting of tubes 35, 36, 34 and 31. In this manner a conductive chain of channel tubes is being built up piece by piece with each channel tube being selected in accordance with one of the digits of the input code.

During the sixth interval in the sequence of operation the sequence switch makes contact through its terminals 3 and 4. The chain consisting of tubes 35, 36, 34 and 31 therefore remains conductive and five volts from the batteries 20 and 21 are applied to the code tubes 38, 49 and 59. The five volts applied to the anode of the code tube 38 are sufficient to cause it to ionize assuming that there are no resistive losses in the output relay or channel relay 60. The three channel tubes 31, 34 and 36 have already been ionized and so each only requires one volt leaving two volts to ionize the tube 38. The relay 60 therefore operates over a path from battery 21 through terminal 4 of section 18 of the sequence switch 19, terminal 1 of the selector switch 13, bus bar 14, code tube 38, winding of relay 60 and the channel tubes 36, 34 and 31 to ground. The five volts applied to the tubes 49 and 59 do not cause any ionization as the tubes 49 and 59 are part of chains which include only non-ionized tubes. These chains as, for example, the chain consisting of tubes 49, 47, 44 and 41, would require at least eight volts to ionize. The only tubes shown in Fig. 1 which are ionized at this time are the code tubes 35 and 38 and the channel tubes 31, 34 and 36.

During the seventh interval in the sequence of operation the sequence switch 19 moves off its terminal 3 maintaining contact with its terminal 4. The code tube 35 extinguishes but the relay 60 remains operated through the channel tubes 31, 34 and 36 and the code tube 38. The input number 1111 has therefore chosen a channel by means of the setting of the selector switches 10 through 13 to operate the channel relay 60.

During the final or the eighth interval in the sequence of operation the sequence switch 19 moves off its terminal 4 breaking contact from the batteries 20, 21 and 22. All the tubes that are ionized extinguish and the relay 60 returns to normal.

In making the translation, chains of gas tubes were sequentially fired with each chain being controlled by an element of the input code and having at least one channel tube which is maintained conductive dependent upon the code as the other tubes in the chain extinguish. The conductive channel tubes were serially and progressively pieced together to finally provide continuity through the output channel relay. The code tubes are plugged into the circuit of Fig. 1 or removed therefrom according to the input code required for each channel. The channel consisting of channel tubes 31, 34 and 36 which is designated channel A functions to cause the channel relay 60 to operate when the first digit of the input code is 1, the second digit is 1 or 3, the third digit is 1 and the fourth digit is 1 or 2; channel B functions if the first digit is 2 or 3, the second digit is 1 or 2, the third digit is 1 or 3 and the fourth digit is 1 or 3; and channel C functions if the first digit is 3, the second digit is 2 or 3, the third digit is 2 or 3 and the fourth digit 1 or 2.

Figure 2:
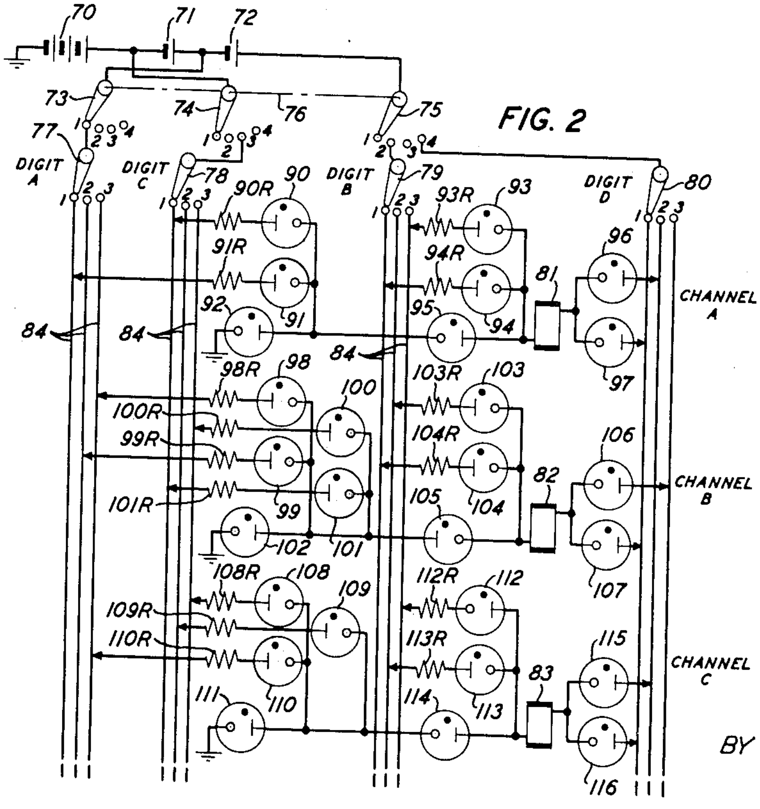
Fig. 2 is a circuit representation of a gas diode translator illustrating the recycling operation.

It is evident from the description of the translator shown in Fig. 1 that if the input code or number is long, as for example, consisting of twelve digits, a larger potential source would be necessary. If twelve digits were utilized the final ionization potentials would be equal to a prohibitive fifteen volts. In addition, adding channel tubes in series effectively reduces the margin against back-up, as is hereinafter described, due to the variation in sustaining voltages. By back-up is meant firing a chain of tubes with one or more therein being ionized in the reverse or back-up direction. Referring to Fig. 2 this prohibitive build-up of potential in accordance with the number of digits in the input code is avoided in the translator shown therein. By recycling the channel tubes, as is hereinafter described, it is possible to keep their number to two for each channel and require a voltage no greater than five volts. Potential is supplied by the batteries 70, 71 and 72. The battery or potential source 70 is a three-volt source; the battery 71 a one-volt source and the battery 72 a one-volt source. The batteries 70, 71 and 72 are connected through the sections 73, 74 and 75 of the sequence switch 76 similar to the sequence switch 19, described above, in reference to Fig. 1, and through the selector switches 77, 78, 79 and 80 to the gas diode network consisting of gas diodes 90 through 116.

During the first interval in the sequence of operation the sequence switch 76 is connected to its terminals 1. The terminal 1 of section 73 of sequence switch 76 is connected through the selector switch 77 and bus bar 84 to the diode 91. The four volts applied across the code tube 91 and channel tube 92 are sufficient to cause them to ionize so that one volt appears across each and two volts across the resistor 91R associated with the code tube 91. A back-up path exists at this time through the tubes 90, 101 and 102. This path, however, requires a total of seven volts including the one volt across the channel tube 92 and only four volts are supplied.

During the second interval in the sequence of operation the sequence switch 76 makes contact with its terminals 1 and 2. The code tube 91 and channel tube 92 remain ionized due to the continued connection through terminal 1 of sequence switch 76 to battery 71. The five volts, however, from battery 72 are connected across the series chain of tubes consisting of code tube 94 and channel tubes 95 and 92. Since the channel tube 92 has already been ionized the five volts are sufficient to cause the tubes 94 and 95 to ionize as well. Another path exists from terminal 1 of selector switch 79 through the code tube 104 and channel tubes 105 and 102. Six volts, however, are required to ionize this chain since no tube therein is ionized at this time. Back-up paths exist through code tubes 93, 103, 113, 90, etc. A voltage greater than five volts supplied however is necessary for ionization of any of these back-up chains or paths and so no tube therein ionizes.

During the third interval in the sequence of operation the sequence switch 76 moves off its terminal 1 and makes contact only with its terminal 2. The code tube 91 therefore extinguishes but the channel tube 92 remains ionized being part of the selected chain consisting of channel tubes 94 and 95 and code tube 94.

During the fourth interval in the sequence of operation the sequence switch 76 makes simultaneous contact with terminals 2 and 3. The contact with terminal 2 continues to connect five volts to the selected chain of tubes 94, 95 and 92. The contact with terminal 3 connects three volts from battery 70 through selector switch 78 which corresponds or provides the third digit of the input code to the code tubes 90 and 101. The three volts are connected in this manner across the chain consisting of the code tube 90 and the ionized tube 92 allowing the code tube 90 to ionize as well. The three volts applied across the code tube 101 and channel tube 102 are insufficient to ionize these tubes since each requires two volts to break down and neither is ionized at this time. The channel tubes 92 and 95 and the code tubes 94 and 90 are conductive therefore at the end of the fourth interval.

During the fifth interval in the sequence of operation the sequence switch 76 moves off the terminal 2 but remains in contact with the terminal 3. The five volts from battery 72 are removed from the chain of tubes 94, 95 and 92. The channel tube 92, however, is part of the ionized chain consisting of the code tube 90 and the channel tube 92 and so remains ionized. The code tube 93 and the channel tube 95 extinguish thus retrogressing the ionization of the channel tubes in channel A. Only the code tube 90 and channel tube 92 remain ionized at this time.

During the sixth interval in the sequence of operation the sequence switch 76 makes contact with terminals 3 and 4. The contact with terminal 3 maintains the tubes 90 and 92 conductive and the contact with terminal 4 supplies five volts through selector switch 80 to the code tubes 97, 107 and 116. The five volts connected to tube 97 appear across the chain consisting of tube 97, the winding of channel relay 81 and channel tubes 95 and 92. Since the channel tube 92 is ionized at this time and the resistance of the winding of relay 81 is negligible, the five volts are sufficient to ionize the tubes 95 and 97. Channel A progressively and retrogressively ionizes in this manner to cause the channel relay 81 to operate providing the required output. The five volts applied to the diodes 107 and 116 are insufficient to cause the chains in which they occur to ionize as each of these chains has at least three tubes that are not ionized at this time. In this manner the translator as shown in Fig. 2 recycles, that is, a chain of channel tubes is progressively and retrogressively ionized until finally the entire channel is ionized and the output channel relay operates. The recycling operation avoids the necessity for high voltages when the input code consists of many digits.

Figs. 3 through 7, when arranged in accordance with the arrangement in Fig. 8, illustrated a gas diode translator utilizing the principles of the present invention described above in reference to Figs. 1 and 2. In addition, this translator illustrates various input codes and their respective translation to provide a translation function in a similar manner as do the electromechanical or card translations utilized in a system as described in the Patent 2,585,904 which issued to A. J. Busch on February 19, 1952. It is possible to utilize a six-digit input, a three-digit input, an alternate route input designation, route advance designations and a terminal or through designation.

Figure 3:
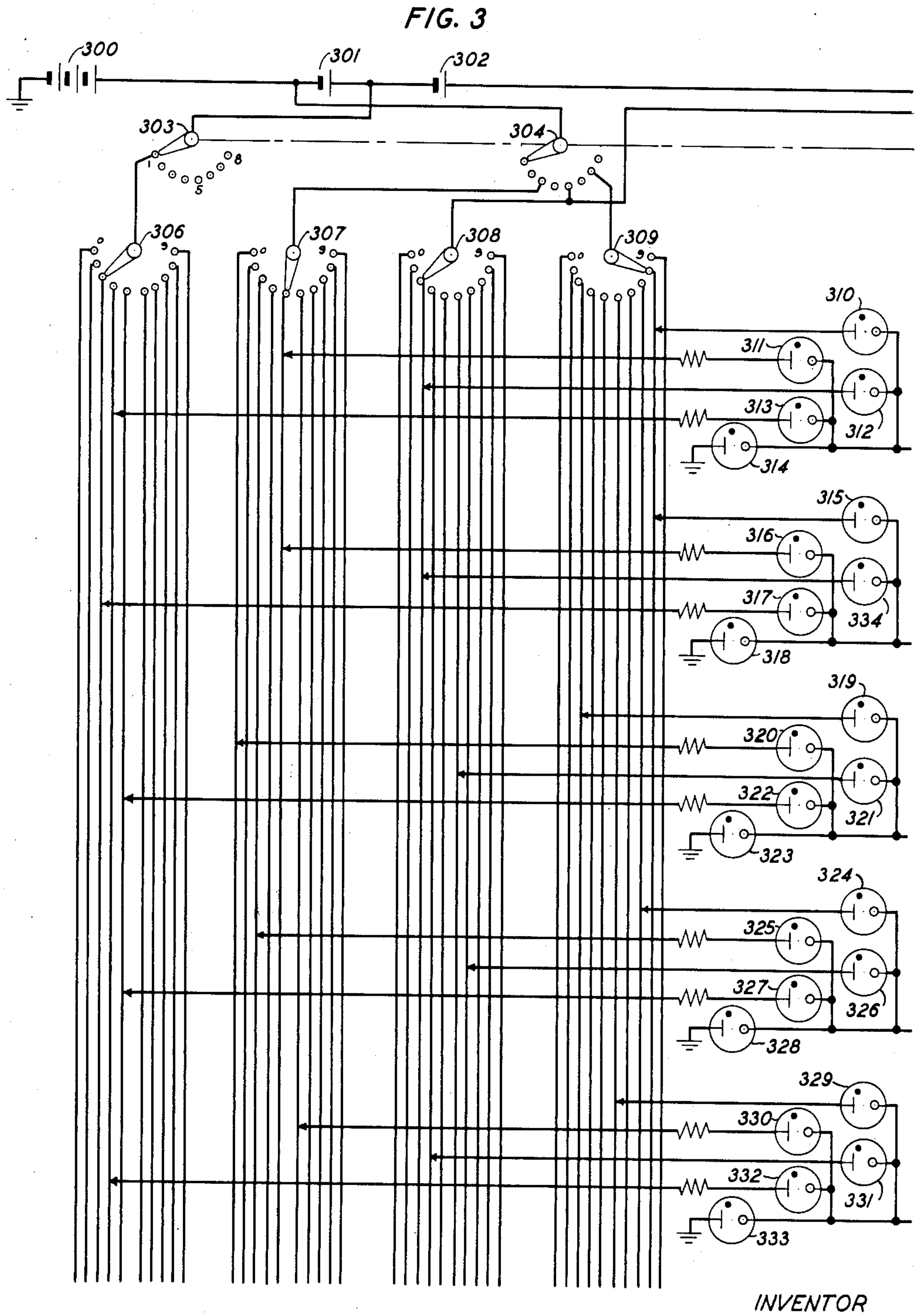
Figure 4:
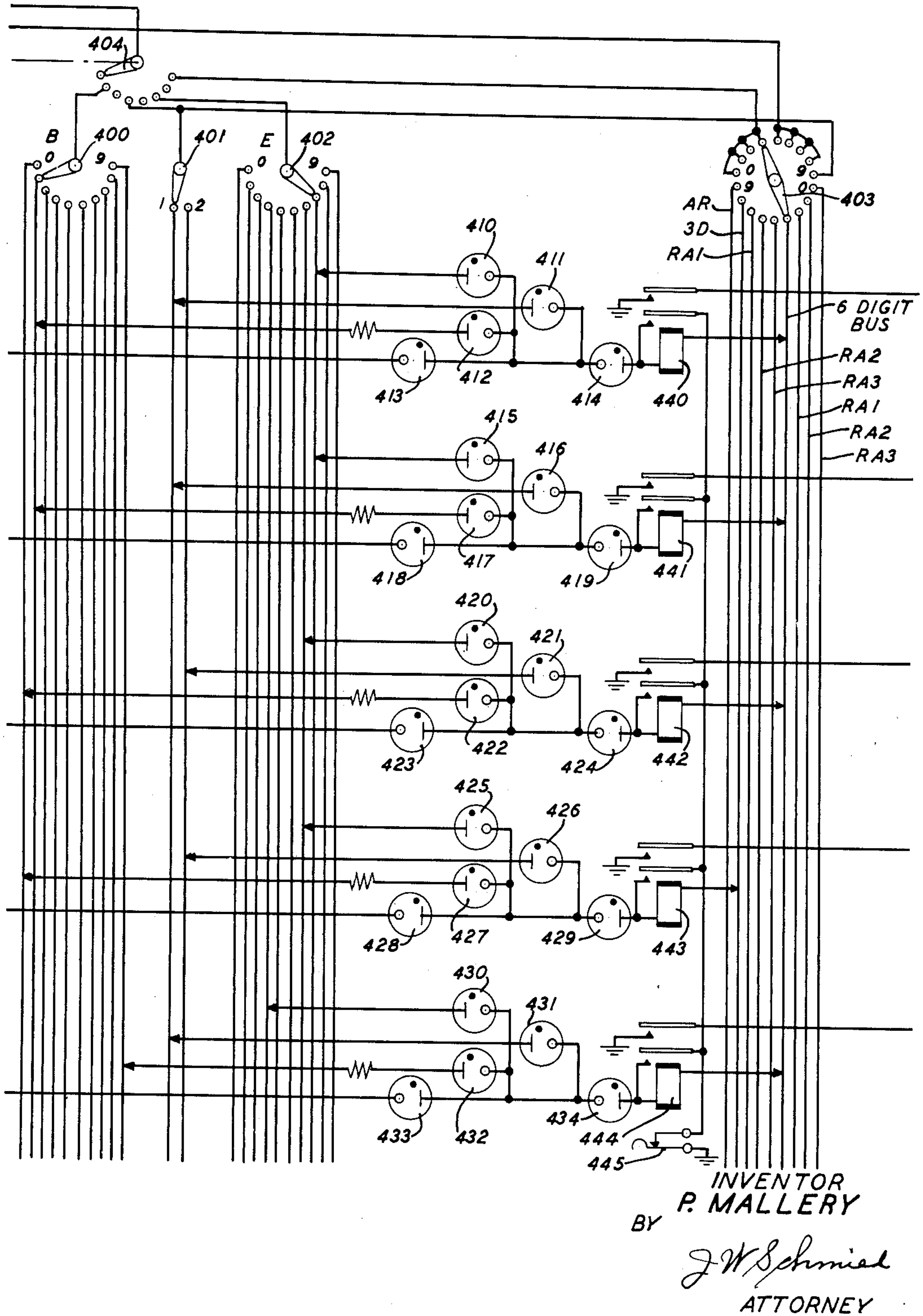
Figure 5:
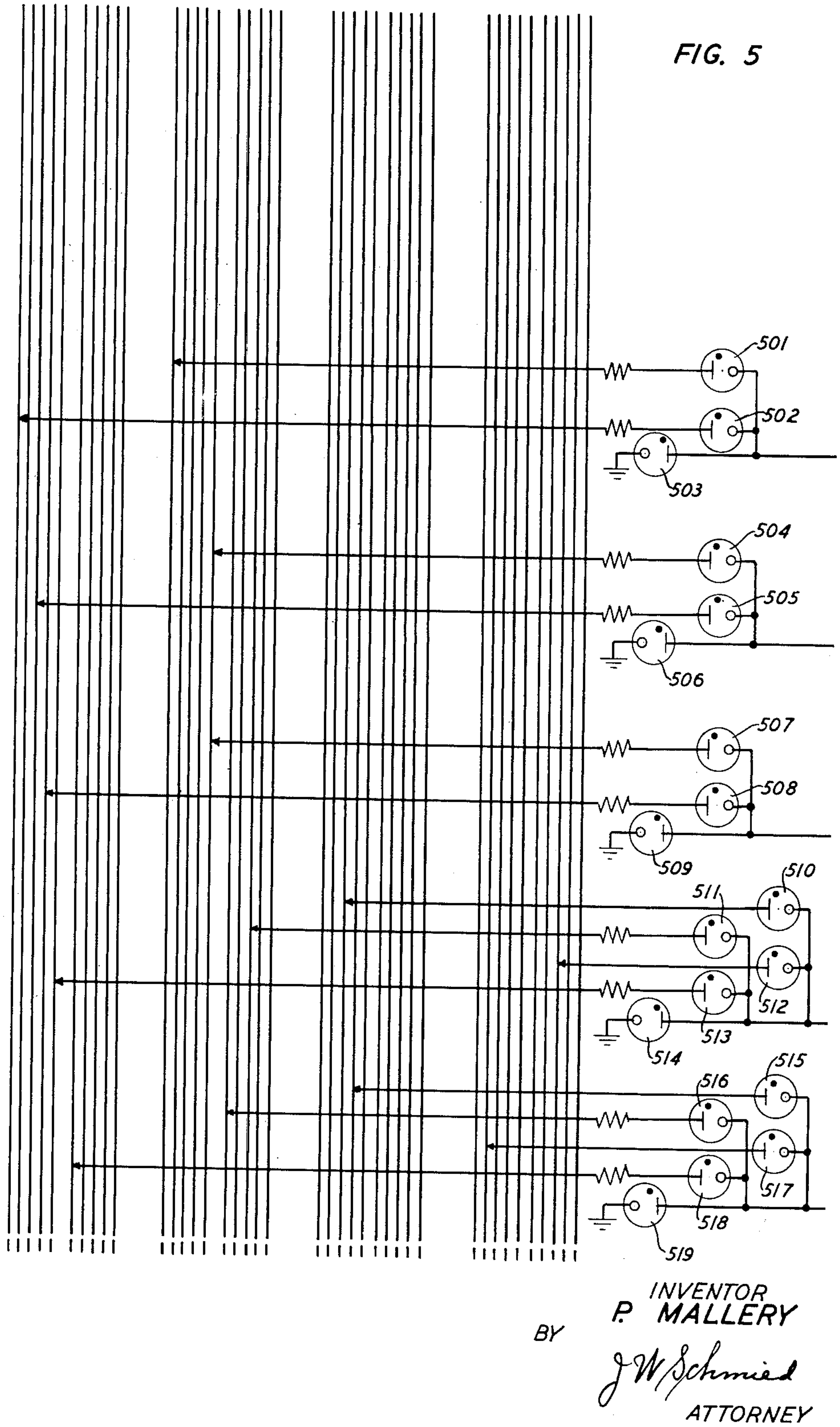
Figure 6:
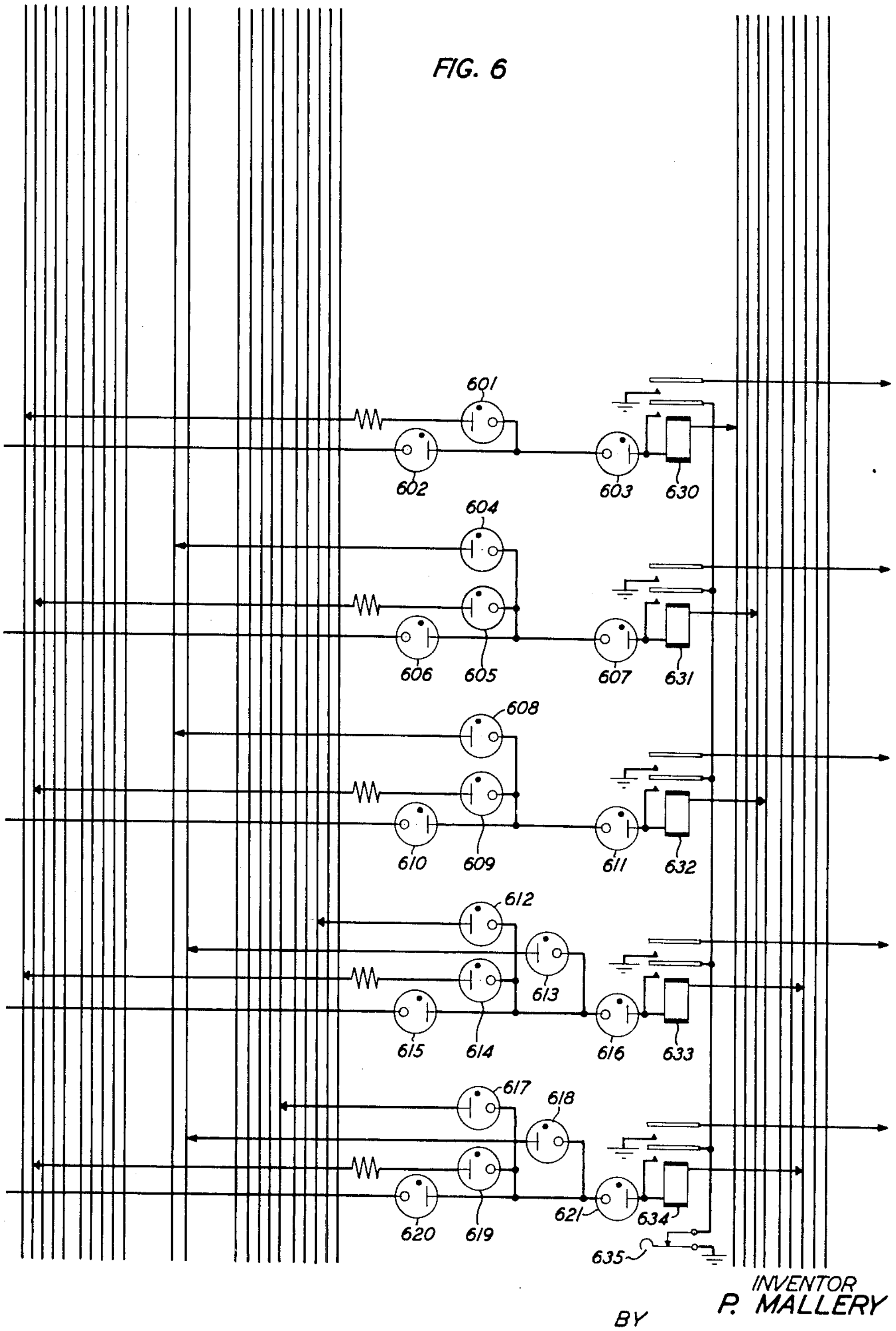

The numerals in the Figs. 3 through 7 have as their first digit the number of the page in which the component appears. The voltages are supplied by three batteries 300, 301 and 302 which are shown in Fig. 3. The battery 300 supplies a three-volt potential and batteries 301 and 302 supply one volt each. These voltages are actually ratios of voltages being three times or equal to the sustaining voltage for the diodes 310 through 334, 410 through 434, 501 through 519 and 601 through 621 shown in Figs 3 through 6. The diodes are only exemplary of the present invention as the translator may be adapted for any number of channels. The potential sources 300 through 302 are connected through the sequential switches 303, 304 and 404 to the input code selector switches 306 through 309 and 400 through 403. The sequential switches 303, 304 and 404 each has eight terminals so that the sequence of operation consists of sixteen intervals instead of the eight described above in reference to Figs. 1 and 2. The selector switches 306, 307, 308, 309, 400 and 402 are the digit selector switches and are set in accordance with the input code. The switches are set for an input number of 214278 since, as hereinafter described, switch 306 gives the first digit, switch 400 is set for the second, switch 307 for the third, switch 308 for the fourth, switch 402 for the fifth and switch 309 for the sixth or last. The selector switch 401 designates in position 1 that the connection is part of a chain of trunk lines or a via-only connection and in position 2 that it is either a terminal or a trough link or a non-via-only connection. The selector swith 403 is the miscellaneous selector switch and is set in accordance for the requirement for a three-digit selection, a six-digit selection, a route advance or an alternate route. In the position as shown making contact with the upper and lower terminals 3, a six-digit selection or output is indicated. With the selector switches 306 through 309 and 400 through 403 set as shown in Figs. 3 and 4, the following sequence of operation occurs when the sequence switches 303, 304 and 404 move in a counterclockwise manner across their terminals 1 through 8.

When the sequence switches 303, 304 and 404 connect the potential sources 300 through 302 to their terminals 1, four volts are connected from the junction of batteries 301 and 302 to the first digit selector switch 306. The switch 306 is set at its terminal 2 so that the four volts are connected through the corresponding bus bar to the code tubes connected thereto, namely the code tubes 317 and 505. Since the diodes shown in Figs. 3 through 7 are only exemplary, other code tubes not shown may also be connected to the bus bar connected to terminal 2. The four volts are applied in this manner across the code tube 317 and channel tube 318 and also across the code tube 505 and channel tube 506. Since each tube requires two volts to break down, all four tubes ionize. The four volts are insufficient to initiate ionization in any of the back-up paths as, for example, through the code tubes 316 and 504.

During the second interval in the sequence of operation the selector switches 303, 304 and 404 make contact with their terminals 1 and 2. Ionization is maintained through the tubes 317, 318, 505 and 506 and ionization is initiated by the five-volt application from battery 302 through the second digit selector switch 400 to the code tube 417. The chain of tubes 417, 418 and 318 ionizes since the channel tube 318 was ionized during the first interval and requires a potential of only one volt leaving four volts for the tubes 417 and 418. The five volts are also applied to the chain of tubes 412, 413 and 314 but are insufficient to cause them to ionize as the tube 314 is not conducting at this time. The five volts are also applied to the chain of tubes 605, 606 and 506 and since the tube 506 is ionized at this time the five volts are sufficient to cause the tubes 605 and 606 to ionize as well and finally the five volts are also applied to the chain of tubes 609, 610 and 509 but are insufficient to cause them to ionize since the channel tube 509 was not previously ionized. At the end of the second interval the code tubes 317, 417, 505 and 605 and the channel tubes 318, 418, 506 and 606 are ionized.

During the third interval the sequence switches 303, 304 and 404 move off their terminals 1 retaining connection with their terminals 2. The connection of four volts through the selector switch 306 is in this manner removed causing the code tubes 317 and 505 to extinguish. The channel tubes 318 and 506, however, remain conducting being part of the ionized chains of tubes 417, 418 and 318 and 605, 606 and 506. These six tubes are the only tubes that are ionized at the end of the third interval.

During the fourth interval in the sequence of operation the sequence switches 303, 304 and 404 make contact with their terminals 2 and 3. Three volts from battery 300 are connected through the sequence switch 304 to the third digit selector switch 307. The selector switch 307 is set for the digit 5 and connects the three volts therethrough to the code tubes 311, 316, 504 and 507. The three volts connected across the tubes 311 and 314 are insufficient to cause them to ionize but the three volts connected across the tubes 316 and 318 are sufficient to cause the code tube 316 to ionize since the channel tube 318 is ionized at this time and requires only one volt to sustain ionization. The three volts applied across the tubes 504 and 506 are sufficient in a similar manner to initiate ionization in the code tube 504 but the three volts connected across tubes 507 and 509 are insufficient to cause ionization therein. Thus at the end of the fourth interval the code tubes 316, 417, 504 and 605 and the channel tubes 318, 418, 506 and 606 are ionized.

During the fifth interval in the sequence of operation the sequence switches 303, 304 and 404 break contact with their terminals 2 retaining contact with their terminals 3. The five volts applied to code tubes 417 and 605 are removed allowing these code tubes and the channel tubes 418 and 606 as well to extinguish. The channel tubes 318 and 506, however, remain conducting being part of the ionized chains consisting of tubes 316, 318 and 504, 506. Only these four tubes remain ionized at this time.

During the sixth interval in the sequence of operation the sequence switches 303, 304 and 404 make simultaneous contact with their terminals 3 and 4. The terminal 4 of sequence switch 404 is connected to the selector switch 401 and to terminal 9 of the miscellaneous selector switch 403. The selector switch 403 is set to its terminal 3 so the terminal 9 which is the alternate route terminal selection is not utilized during the present sequence of operation. The selector switch 401 is set at its position 1 which indicates a via-only connection or translation so that the translation is to a trunk which is part of a chain of trunk links and not a terminal trunk connection. The five volts are therefore applied through the connector switch 401 to the code tubes 411, 416, 431, 604, 608, etc. The five volts are only effective to ionize the code tubes 417 and 605 since the respective channel tubes 318 and 506 are ionized at this time. Two chains of tubes are therefore ionized, the chain of tubes 416, 418 and 318 and the chain of tubes 604, 606 and 506. The code tubes 316 and 504 remain ionized during this sixth interval in the sequence of operation.

During the seventh interval in the sequence of operation, the sequence switches 303, 304 and 404 make contact only with their terminals 4, breaking contact with their terminals 3. The code tubes 316 and 504 therefore extinguish. During the eighth interval in the sequence of operation the sequence switches 303, 304 and 404 make contact with their terminals 4 and 5. The terminal 5 of sequence switch 304 is connected to the fourth digit selector switch 308 and to the terminal 4 of the selector switch 403. The terminal 4 of selector switch 403 is ineffective at this time since the selector switch 403 is set at its terminal 3. The selector switch 307 is set at its terminal 2 so that the three volts are applied to the code tubes 312, 334 and 510. The three volts are insufficient to cause the code tubes 310, 314, 510 and 514 to ionize since the channel tubes 314 and 514 are not ionized at this time. The code tube 334, however, ionizes or breaks down since its corresponding channel tube 318 was previously ionized. At the end of the eighth interval therefore the tubes 334, 318, 418, 416, 506, 606 and 604 are ionized. During the ninth interval the sequence switches 303, 304 and 404 break contact with their terminals 4 but retain contact with their terminals 5. Potential is removed thereby from the chain of tubes 604, 606 and 506 causing them to extinguish. Potential is also removed from the code tube 417 causing it and the channel tube 418 to extinguish. The tubes 334 and 318, however, remain conductive or ionized. A selection was made therefore between the channel corresponding with the channel tube 318 and the channel corresponding with the channel tube 506.

During the tenth interval in the sequence of operation the sequence switches 303, 304 and 404 make contact with their terminals 5 and 6. The five volts from battery 302 is connected through terminal 6 of sequence switch 404 and terminal 7 of the fifth digit selector switch 402 to the code tubes 410, 415 and 612. The five volts are insufficient to ionize the chains comprising the code tubes 410 and 612 but are sufficient to ionize the tubes 415 and 418 which are part of the chain of tubes 415, 418 and 318 since the channel tube 318 was ionized at this time. During the eleventh interval contact is made only at the terminal 6 of the sequence switches 303, 304 and 404 so that code tube 334 extinguishes. During the twelfth interval contact is made with terminals 6 and 7 upon the sequence switches 303, 304 and 404. The three volts are connected through terminal 7 of sequence switch 304 and terminal 8 of the sixth digit selector switch 309 to the code tubes 310 and 315. Since the channel tube 314 is not ionized the code tube 310 cannot ionize but since the channel tube 318 is ionized the code tube 315 ionizes as well. During the thirteenth interval contact is only made with the terminal 7 upon the sequence switches 303, 304 and 404 so that the tubes 415 and 418 extinguish leaving the tubes 315 and 318 ionized. During the fourteenth interval contact is made with terminals 7 and 8 upon the sequence switches 303, 304 and 404 and five volts are connected through the terminals 3 of the selector switch 403 to the sixth digit bus bar which corresponds to the terminals 3. The five volts are connected in this manner to the windings of channel relays 440, 441, 442, 444, etc. The windings of the channel relays 440 through 444 and 630 through 634 contain negligible impedance so that the five volts are essentially applied to the channel tubes 414, 419, 424 and 434. The only tubes that were ionized at this time were the tubes 315 and 318 so that the five volts are only sufficient to ignite the channel tubes 419 and 418. All other possible paths have at least three unionized tubes therein and so do not break down. The selection made by the miscellaneous selector switch 403 is the final selection as all three channel tubes 318, 418 and 419 are ionized providing a conductive path through the winding of the output channel relay 441 which thus operates. When the channel relay 441 operates, it closes through its lower contact and the switch 445 a locking path to ground allowing the ionized tubes 318, 418 and 419 to extinguish. This locking path is provided to allow the various gas tubes to be utilized for the minimum possible time to sustain the life of the tubes.

Figure 7:
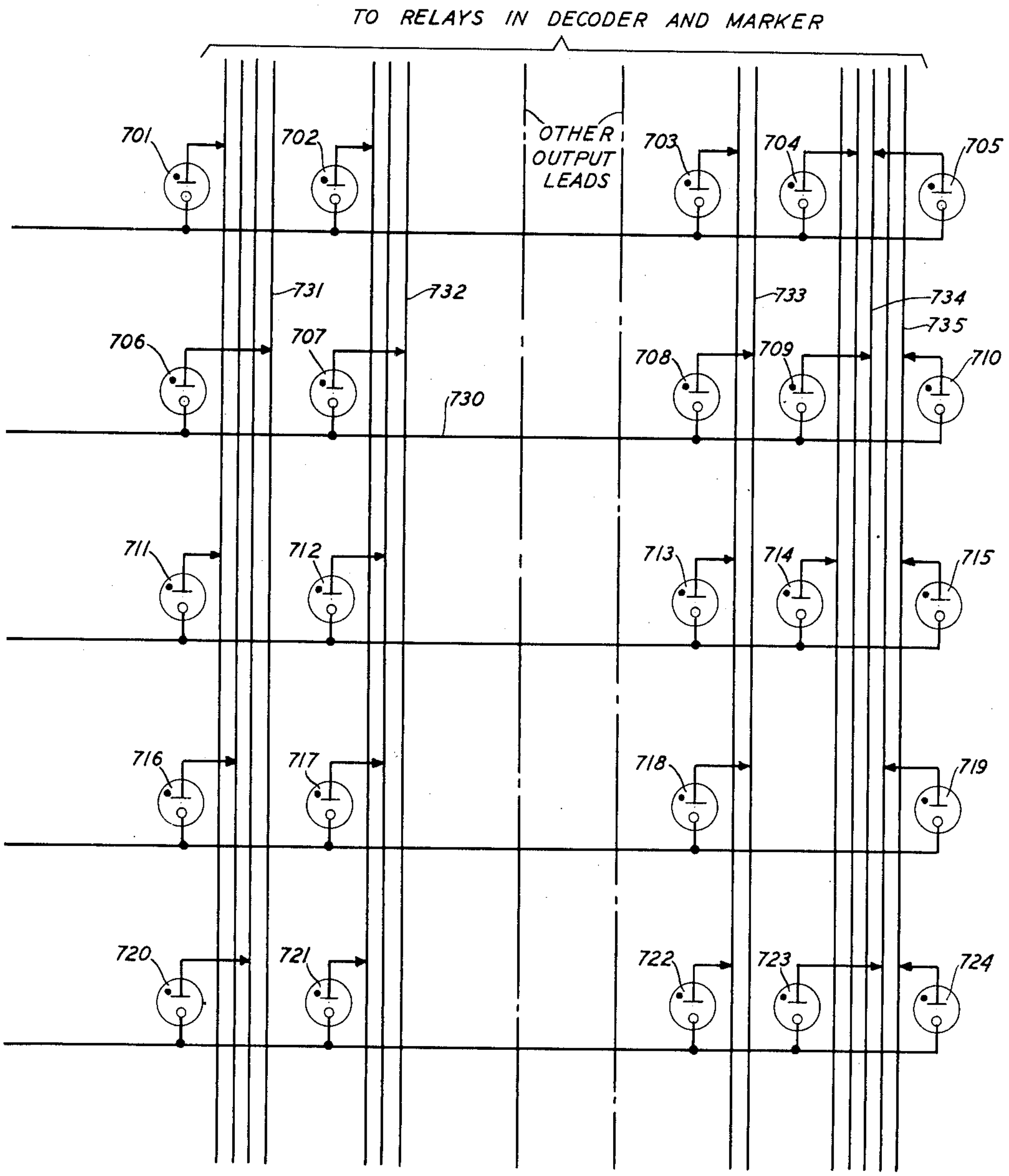

The operation of the channel relay 441 connects ground through its upper contact to the diode network shown in Fig. 7. The vertical bus bars are connected to relays in a decoder and marker or similar circuit, not shown, which provides a positive potential to these bus bars or output leads. When ground is connected to a horizontal bus bar as, for example, the bus bar 730, due to the operation of the channel relay 441, the diodes 706, 707, 708, 709 and 710 ionize and provide an output indication upon the vertical bus bars 731, 732, 733, 734 and 735. Each horizontal bus bar is connected through a plurality of the diodes 710 through 724, etc. to combinations of vertical output leads providing a different combinatin for each horizontal input bus bar. The rectangular switching network shown in Fig. 7 provides an individual combination of outputs for each input indication provided by the operation of one of the channel relays 440 through 444, 630 through 634, etc. It is not necessary to utilize the rectangular switching network shown in Fig. 7 to provide the necessary combination outputs as various mechanical and circuit schemes may be utilized.

The sequence of operation described above was in reference to a six-digit translation. In a similar manner, depending upon the setting of the selector switches 306 through 309 and 400 through 403, a three-digit, alternate route or route advance translation may be selected. The input code to operate the channel relay 440 would be six-digit-VO-314278 with the "VO" symbol signifying a via-only or through connection. The input code to operate the channel relay 441, as described above, would be six-digit-VO-214278. The input code corresponding to the selection of the channel relay 442 is six-digit-NVO-400562 with "NVO" connotating non-via only. The input code designation corresponding to the operation of channel relay 443 is three-digit-NVO-402. The input indication corresponding to the channel relay 444 is six-digit-VO-395335. The input designation corresponding to the operation of the channel relay 630 is three-digit, alternate route-000. The input designation corresponding to the selection of the channel relay 631 is three-digit, route alternate, 1-214-VO. The input, designation corresponding to the operation of channel relay 632 is three-digit, route alternate, 2-VO-314. The input designation corresponding to the operation of channel relay 633 is six-digit, route alternate, 1-NVO-407277 and finally the input notation corresponding to the operation of channel relay 634 is route alternate 1-six-digit-NVO-515341. Setting the selector switches 306 through 309 and 400 through 403 in accordance with any of these input designations, notations or codes will provide the operation of the corresponding channel relays 440 through 444 and 630 through 634 to provide to the network shown in Fig. 7 the combination of outputs to the decoder and marker.

It is to be understood that the above-described arrangements are illustrative of the application of the principles of this invention. Numerous other arrangements may be devised by those skilled in the art without departing from the spirit and scope of the invention.

What is claimed is:

1. A gas diode translator comprising an input circuit; an output circuit; a plurality of chains of gas tubes, each of said chains having at least one channel tube, said channel tubes being serially connected to form a plurality of channels to said output circuit; and means whereby the ionization of said channel tubes is individually controlled by said input circuit.

2. A gas diode translator comprising a sequence circuit; a plurality of input selector switches; a plurality of code tubes with each connected through a selected one of said input selector switches to said sequence circuit; a plurality of channel tubes forming chains of channel tubes, each of said channel tubes also forming with selected others of said channel tubes and code tubes selectable chains of tubes, and selecting means whereby the operation of said sequence circuit sequentially selects selected ones of said selectable chains to cause the selection of a selected one of said chains of channel tubes.

3. A gas diode translator comprising a plurality of serially connected chains of gas diodes; an input circuit for selectively and sequentially applying potentials to selected ones of said chains; means for causing some of said selected chains to ionize; and means whereby the sequential ionization of said chains establishes a channel chain comprising gas diodes in said plurality of serially connected chains of gas diodes.

4. A translator circuit comprising a plurality of devices having a negative resistance characteristic and requiring a breakdown potential substantially greater than the sustaining potential, said devices being connected in selectable chains; a source of potential equal to the sum of the breakdown and sustaining potential of said devices; other sources of potential equal to the sustaining potential of said devices; an input selector circuit, for sequentially and selectively connecting combinations of said sum and other sources of potential to selected ones of said selectable chains; and an output circuit energizable responsive to the energization of a selected plurality of said devices in said selected chains where each of said selected plurality of said devices is part of a different one of said selected chains.

5. A gas diode translator comprising a plurality of chains of gas diodes; an input circuit comprising sources of discrete potential and selecting and sequential switches for selectively and sequentially connecting said discrete potential sources to said chains of gas diodes, means whereby each removal of said sources of discrete potentials from said selected chains maintains at least one of said gas diodes in the selected ones of said chains to remain selected; a plurality of selectable output devices, and means including said maintained selected gas diodes for causing the operation of one of said selectable output devices.

6. A gas diode translator comprising a plurality of code tubes and channel tubes; a sequentially operable input circuit for causing the sequential ionization of selected ones of said code and said channel tubes, and means whereby the sequential ionization of said code and channel tubes progressively builds up a conductive chain of ionized channel tubes.

7. A gas diode translator comprising a plurality of code tubes and channel tubes; a sequentially operable input circuit for causing the sequential ionization of selected ones of said code and said channel tubes, means whereby the sequential ionization of said code and channel tubes progressively builds up a conductive chain of ionized channel tubes; and an output circuit operable upon the ionization of said conductive chain.

8. A translator comprising an input circuit; a channel network having a plurality of code channel devices; and a plurality of output devices, said code devices connecting said input circuit and said channel devices, said channel devices connecting said code devices and said output devices, means whereby the operation of said input circuit energizes chains of selected ones of said code and said channel devices, and means whereby selected ones of said energized channel devices form a channel to operate one of said output devices.

9. A translator comprising code tubes, channel tubes, output devices, selector switches for determining the ionization of at least one of said code tubes and one of said channel tubes, and sequential means whereby selected ones of said channel tubes progressively and retrogressively form a conductive channel to operate one of said output devices.

10. A translator comprising an input circuit; a channel network having a plurality of code devices connected to said input circuit and a plurality of channel devices connected to said code devices; a plurality of output devices connected to said channel devices, means for selecting some of said code devices and some of said channel devices; means whereby the operation of said input circuit energizes chains of said selected ones of said code and channel devices, and means whereby selected ones of said energized channel devices are recycled to form a conductive operating path for one of said output devices.

11. In a translating device, a plurality of input registers; a plurality of output circuits; a first plurality of gaseous conducting tubes connected to said input registers; a second plurality of gaseous conducting tubes connected to said first plurality of tubes; means whereby the ionization of said first and second pluralities of tubes are selectively controlled by the setting of said input registers including a sequence circuit for sequentially ionizing chains of selected tubes of said first and said second pluralities of tubes; means whereby the ionized tubes in said second plurality form conductive chains; and means whereby one of said chains becomes effective to energize a selected one of said output circuits.

12. A translator comprising a plurality of two-state devices normally in one of said states; a plurality of selecting elements each settable in one of a plurality of positions; means controlled by said selecting elements for selecting and operating chains of said devices to the other of said states; means controlled by said selecting elements for maintaining operated some of said devices in said selected chains; and circuit components controlled by said maintained operated devices for providing an output indication.

13. A translator in accordance with claim 12 comprising in addition means for connecting said maintained operated devices into a conductive chain as an operating path for one of said circuit components.

14. A translator in accordance with claim 13 wherein each of said devices in said conductive chain is part of a different one of said selected chains.

15. A translator in accordance with claim 14 wherein said last-mentioned means comprises control means for progressively and retrogressively connecting said maintained two-state devices.

16. A gas discharge diode translator system comprising a plurality of gas diodes arranged in groups of chain circuits including interconnections for including a diode in a chain circuit in one group also in the chain circuit of another group of chain circuits; an input circuit for selecting a chain circuit of each of said groups; means for sequentially ionizing the gas diodes in said selected chain circuits in sequence; and means for extinguishing the diodes in a selected chain circuit after the diodes of the subsequently ionized selected chain circuit have been ionized whereby said diode connected in both said chain circuits remains ionized.

17. A translator comprising a plurality of gaseous conduction diodes arranged in chain circuits, each of said chain circuits having at least one of said gaseous conduction diodes in common with another one of said chain circuits; an input circuit for selecting a plurality of said chain circuits; means for ionizing the diodes of said selected chain circuits one after another; and means operative after the ionization of the diodes of one of said chain circuits for extinguishing all of said previously ionized diodes except said common gaseous diodes.

18. A gaseous conduction translator comprising a plurality of gaseous conduction multielement tubes; means for interconnecting pluralities of said tubes in serial chain circuits arranged in groups, each of said chain circuits of one of said groups of said chain circuits having a multielement gas conduction tube in common with a chain circuit of another one of said groups of said chain circuits; means for selecting one of said chain circuits of each of said groups; means for energizing said tubes in said selected chain circuit of each of said groups in succession; and means for deenergizing said tubes in one of said selected chain circuits except said common tube upon the energization of said selected chain circuit of another one of said groups whereby a chain circuit of said common tubes is established.

19. A translator comprising a plurality of multielement gaseous conduction tubes; means for serially connecting said tubes in chain circuits in which at least one of said tubes in each chain is connected in another chain circuit; an input circuit for selecting and sequentially ionizing said tubes in selected ones of the chain circuits; means whereby the sequential ionization of said tubes establishes a channel chain comprising said common tubes; means for energizing another one of said chain circuits including an intermediate one of said common tubes of said channel chain; and means for thereafter extinguishing the portion of said channel chain between said intermediate tube and one end of said channel chain.

References Cited in the file of this patent

UNITED STATES PATENTS

| | | |
|---|---|---|
| 2,300,316 | Raymond | Oct. 27, 1942 |
| 2,317,471 | Meacham | Apr. 27, 1943 |
| 2,614,175 | Dimond | Oct. 14, 1952 |
| 2,633,498 | Schneckloth | Mar. 31, 1953 |
| 2,638,506 | Bray et al. | May 12, 1953 |